Figure 1:
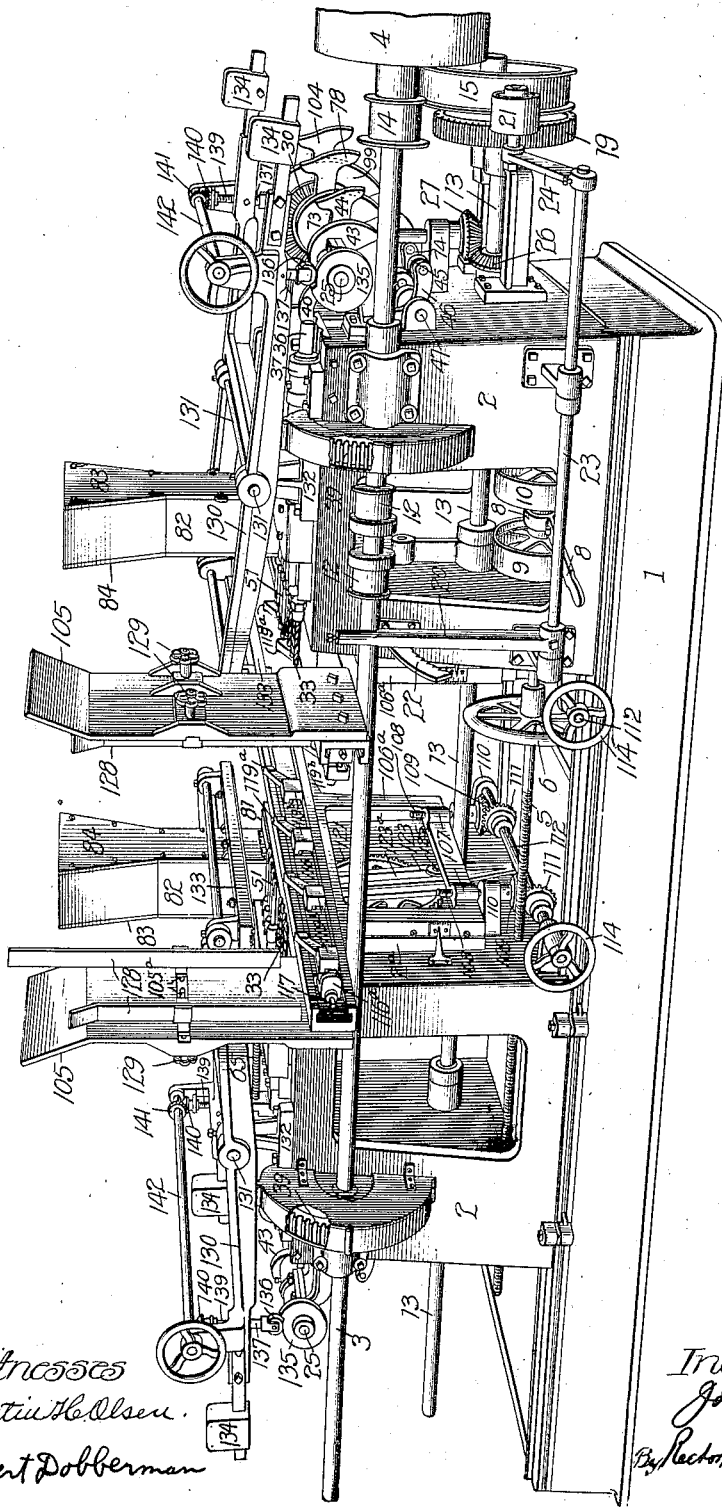

J. R. FRANTZ.
DOWELING MACHINE.
APPLICATION FILED AUG. 10, 1911.

1,137,854.

Patented May 4, 1915.
7 SHEETS—SHEET 1.

Witnesses
Martin H. Olsen.
Robert Dobberman

Inventor
John R. Frantz
By Rector, Hibben, Davis & Macauley
His Attys

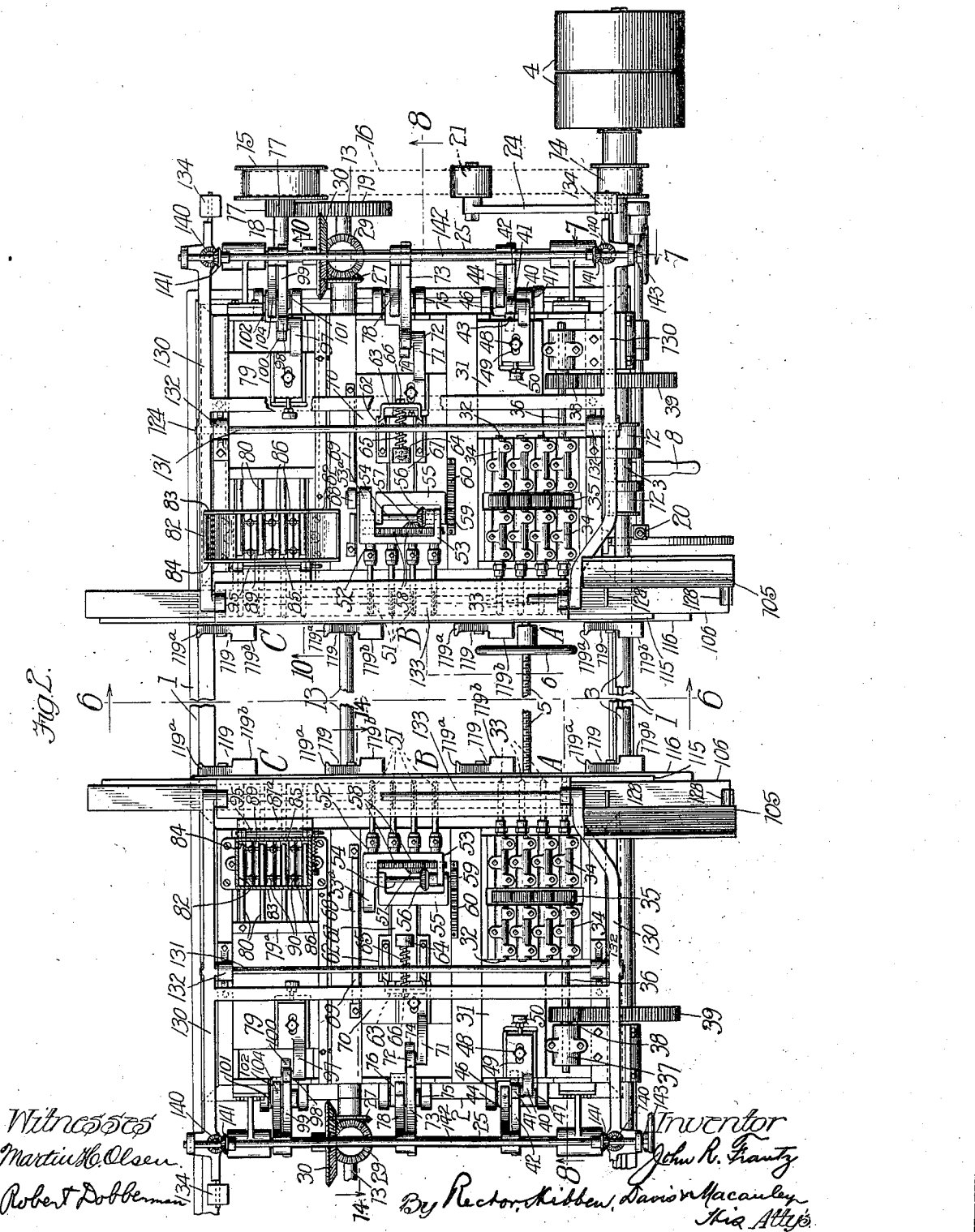

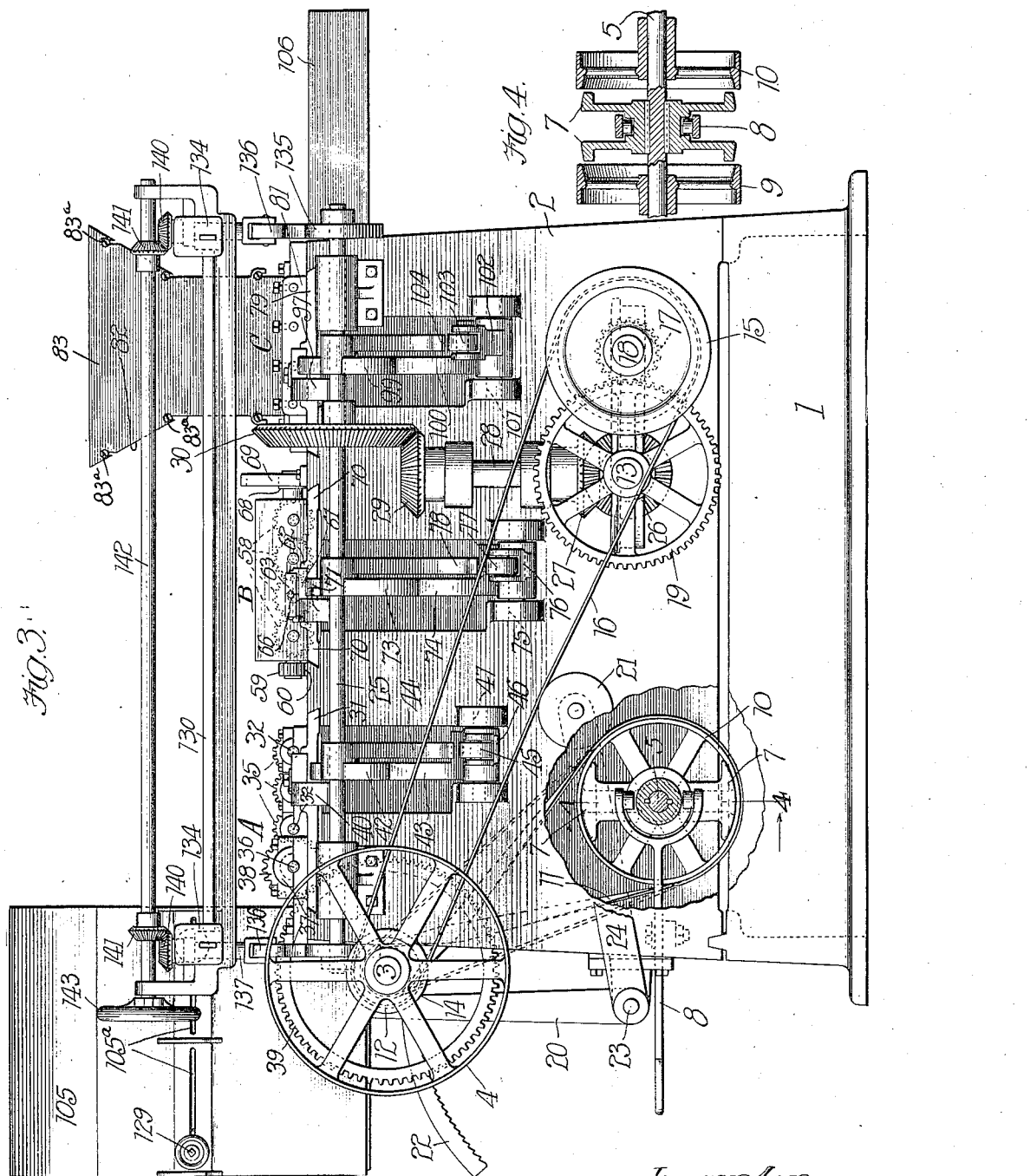

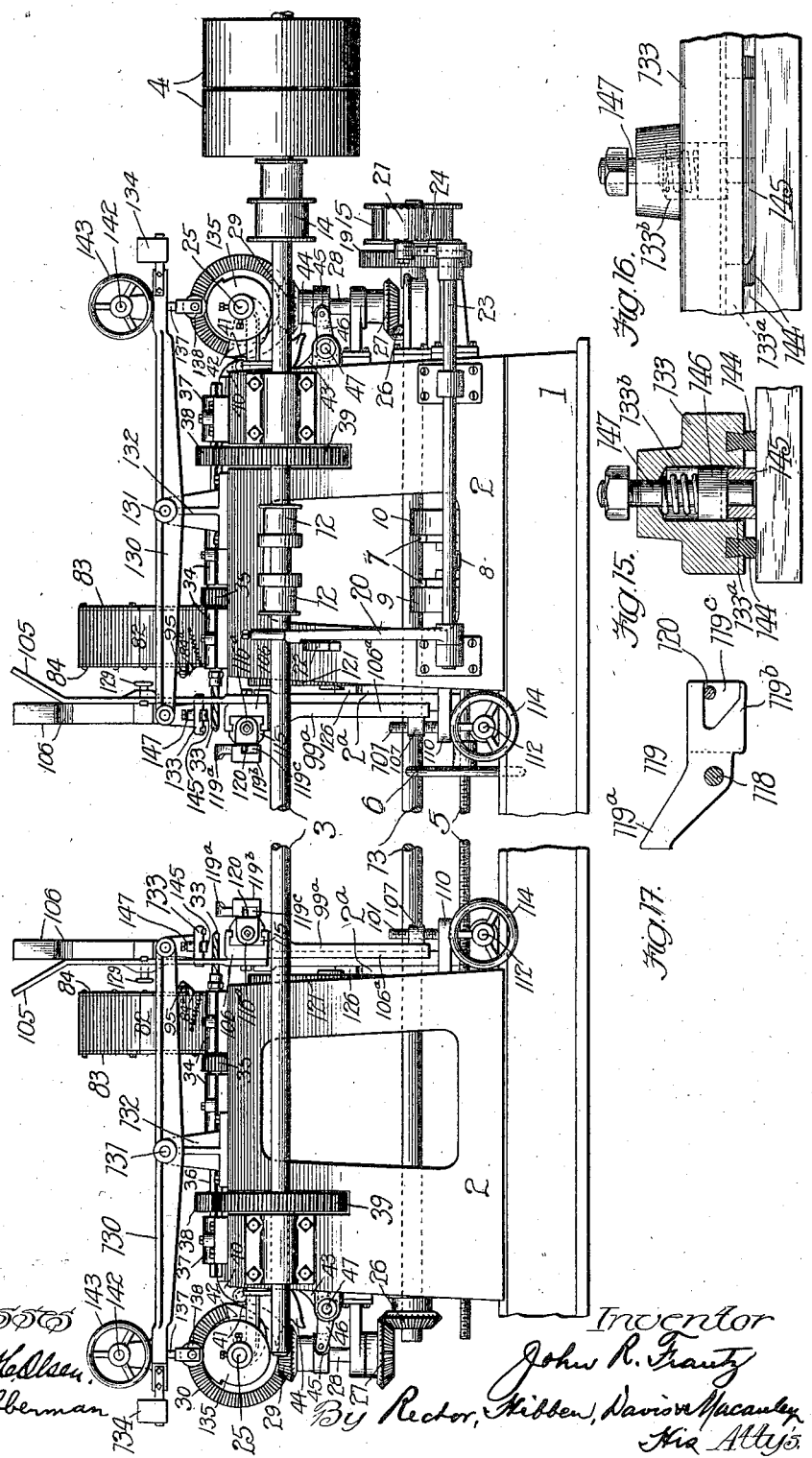

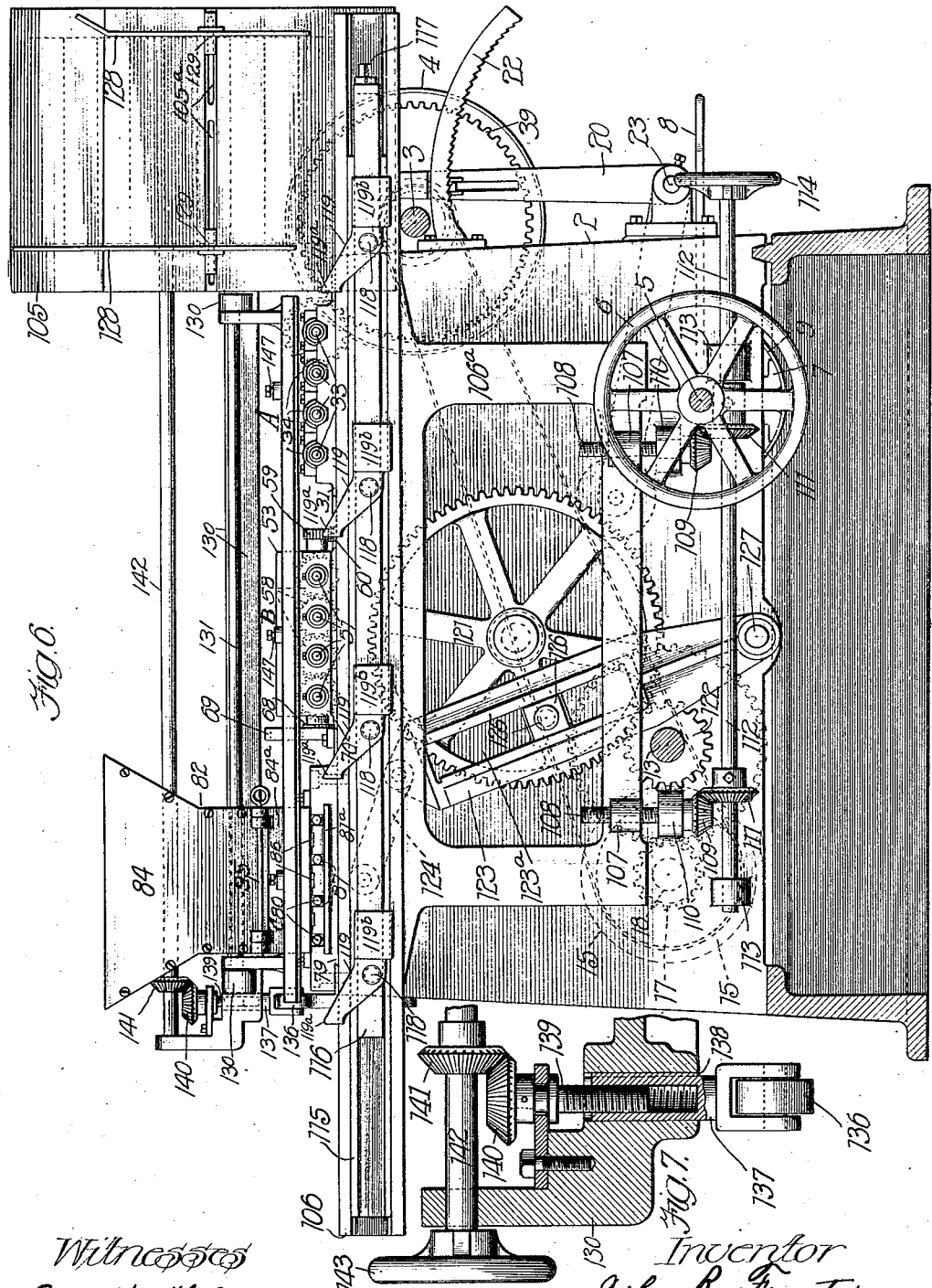

J. R. FRANTZ.
DOWELING MACHINE.
APPLICATION FILED AUG. 10, 1911.
1,137,854.
Patented May 4, 1915.
7 SHEETS—SHEET 6.
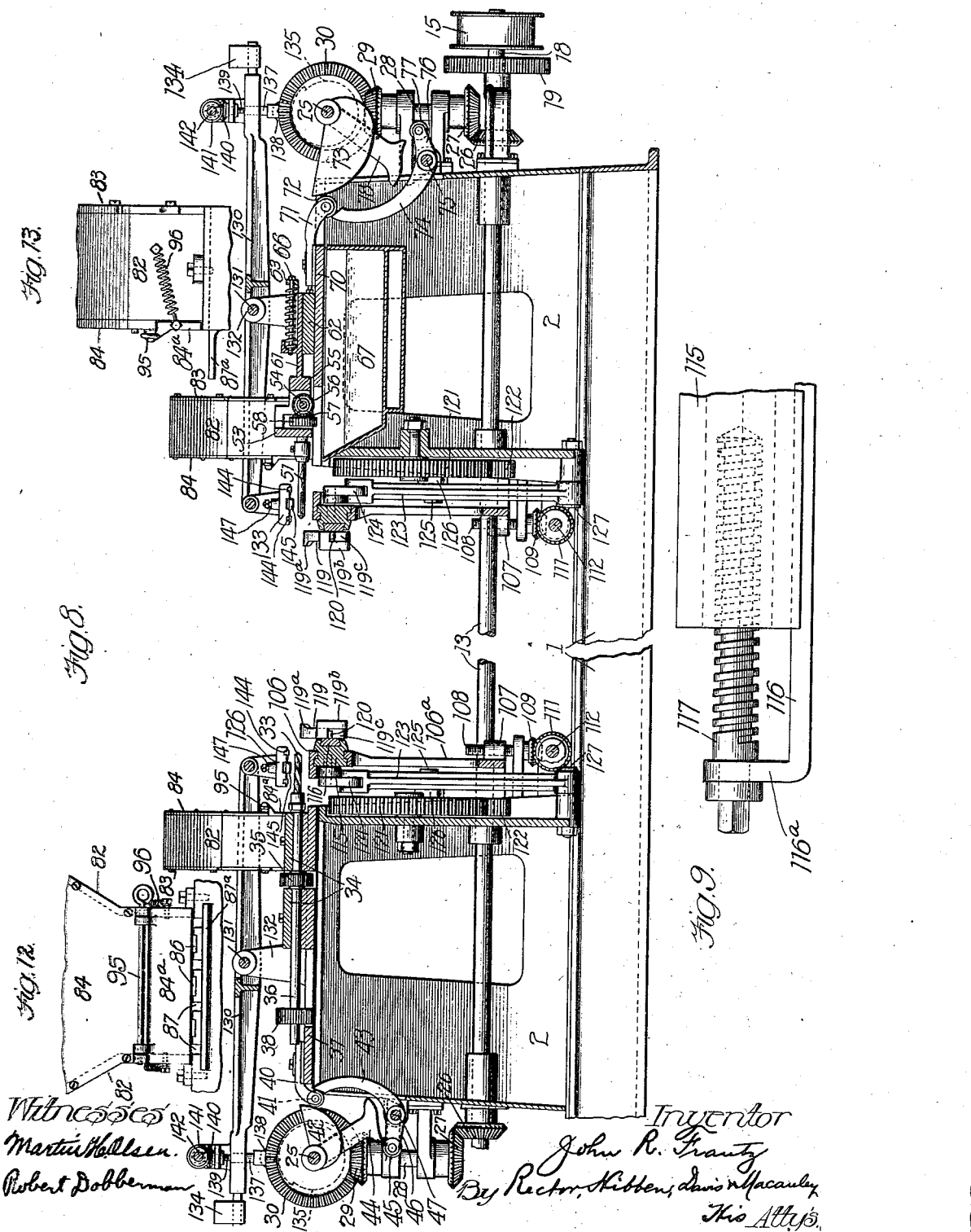

J. R. FRANTZ.
DOWELING MACHINE.
APPLICATION FILED AUG. 10, 1911.
1,137,854.
Patented May 4, 1915.
7 SHEETS—SHEET 7.
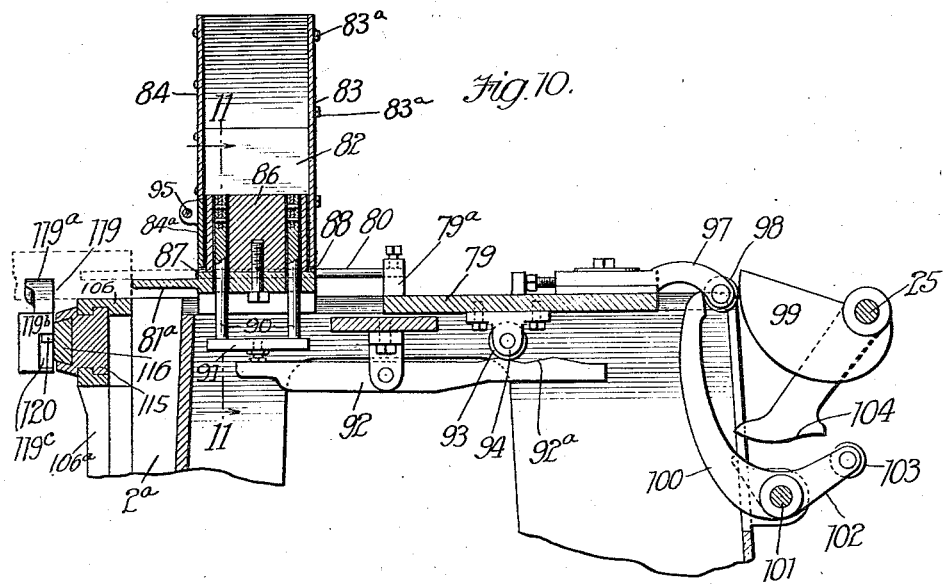
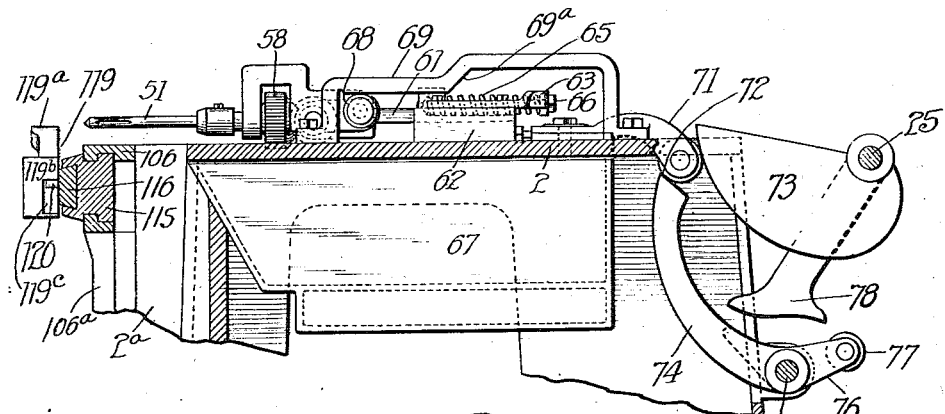
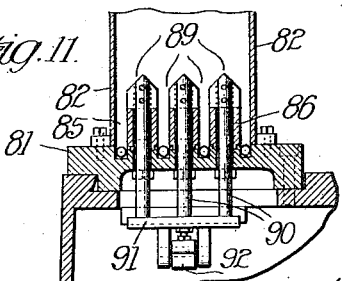
Witnesses
Martin H. Olsen.
Robert Dobberman
Inventor
John R. Frantz
By Rector, Hibben, Davis & Macauley
his Atty's.

weiterhin # UNITED STATES PATENT OFFICE.

JOHN R. FRANTZ, OF OSHKOSH, WISCONSIN, ASSIGNOR TO E. B. HAYES MACHINE COMPANY, OF OSHKOSH, WISCONSIN, A CORPORATION OF WISCONSIN.

DOWELING-MACHINE.

1,137,854.

Specification of Letters Patent.

Patented May 4, 1915.

Application filed August 10, 1911. Serial No. 643,428.

*To all whom it may concern:*

Be it known that I, JOHN R. FRANTZ, a citizen of the United States, residing at Oshkosh, Winnebago county, Wisconsin, have invented certain new and useful Improvements in Doweling-Machines, of which the following is a specification.

My invention relates to doweling machines, that is machines for applying dowels to rails, strips and the like in the woodworking art and, speaking in general terms, the object thereof is to provide a simple, efficient and reliable machine of this character, capable of automatically handling the stock in the different operations.

Speaking more specifically, one of the principal objects or features of my invention is the provision of a machine, as a unitary structure, for automatically and successively boring, gluing and doweling the stock, such stock being fed automatically from a suitable hopper, first to the boring mechanism for boring the dowel holes, second to the gluing mechanism for introducing the glue into the holes and third to the doweling mechanism for the applying and driving of the dowels into the glued holes, from which latter mechanism the stock is discharged from the machine as a completed article. It will be understood that the three different operations referred to are performed simultaneously on three successive pieces of stock that is after the machine has been fully started in operation there are three pieces of stock being operated upon at one and the same time, the first being bored, the second glued and the third having its dowels applied and driven in, the machine herein illustrated being capable of acting upon both ends of the stock simultaneously. It will be obvious that the number of these mechanisms may be increased so that the machine may act simultaneously on more than three pieces but the within disclosure will be sufficient for an understanding of the nature and principles of my machine.

Another principal object of my invention is to provide novel and efficient mechanism for performing the said three operations and for adjusting them as to time of operation and extent of movement or throw. In addition the gluing mechanism is provided with a yielding driving connection for the gluing devices to avoid breakage or injury thereto in case of the obstruction of a hole in the stock due to the breaking off of a drill therein.

Still another principal object is to provide novel and efficient means for feeding the stock in automatic and successive manner from the supply hopper to its different successive positions for action by the boring, gluing and dowel driving mechanisms and its final discharge from the machine.

My invention involves other novel and advantageous features of construction and mode of operation and adjustment of parts as will be apparent from the description hereinafter given.

In the drawings Figure 1 is a perspective of my machine; Fig. 2 a plan view thereof; Fig. 3 an elevation of the right-hand end of the machine shown in Fig. 2; Fig. 4 a sectional detail on the line 4—4 of Fig. 3; Fig. 5 a side elevation of the machine; Fig. 6 a sectional elevation on the line 6—6 of Fig. 2 looking in the direction of the arrow; Fig. 7 a sectional detail on the line 7—7 of Fig. 2 but on a considerably larger scale; Fig. 8 a sectional elevation on the irregular line 8—8 of Fig. 2; Fig. 9 a detail view of the means for adjusting the push bar for the feed dogs; Figs. 10 a section on the line 10—10 of Fig. 2; Fig. 11 a section on the line 11—11 of Fig. 10; Figs. 12 and 13 detail views of the dowel hopper; Fig. 14 a section on the line 14—14 of Fig. 2; Figs. 15 and 16 detail views of the clamping bar; and Fig. 17 a detail view of one of the feed dogs.

Before describing my machine in detail I will state that the same as herein shown is of a duplex character capable of simultaneously acting upon opposite ends of the rails as to all of the three operations aforesaid although it will be understood that my invention in its broader character may be embodied in a machine capable of operating upon only one end of the stock at one time.

Speaking of the machine as illustrated herein that is the duplex machine the same is provided with two bases preferably mounted upon a single floor bed and one of which is capable of adjustment toward and away from the other for accommodating stock of different lengths. Each base carries the three different mechanisms, to wit, the boring mechanism, the gluing mechanism and the dowel driving mechanism in the order named. The general location of these mechanisms is indicated by the reference letters A, B and C. The rails are piled up in the supply hopper one upon the other and are fed to the machine from the bottom of the pile by means of intermittently operated feed dogs which slide the lowermost rail from the pile inwardly toward the machine and then stop with the rail in proper position to be acted upon by the drills of the boring mechanism. The next movement of the feed dogs advances this rail to the gluing mechanism and simultaneously slides the second rail from the bottom of the pile to the boring mechanism so that simultaneously the first rail is glued and the second bored. The next movement of the feed dogs advances the first and second rails one step farther whereupon the first mentioned rail is now in position for action by the dowel driving mechanism the second in position for action by the gluing mechanism and a third rail, which has just been slid from the bottom of the pile, is in position for action by the boring mechanism. This operation proceeds automatically and successively and the completed rails or strips are discharged from the machine. Provision is made for vertically adjusting the feed mechanism in order to present the stock in the proper horizontal plane for action by said different mechanisms and moreover such feed mechanism is provided with another adjustment whereby the stock may be properly presented to the different mechanisms with respect to its lateral position with reference thereto, thereby providing for adjustment of the distance of the holes from one edge of the rail, the centers of the drills or bits as well as of the gluing fingers and drivers being fixed in the present instance but not necessarily so. The machine is also provided with a clamping bar for engaging and clamping the stock or rail while being operated upon.

Now referring specifically to the machine as herein shown the same is provided with a floor bed 1 on which are mounted to slide the two bases 2, these bases rising vertically from the floor bed in the nature of a frame for supporting the various mechanisms hereinafter described. Inasmuch as the mechanisms mounted upon and supported by these bases are duplicates it will be understood that a description of one set, that is the mechanism on one of the bases, will apply to both and consequently the corresponding parts on the two bases are given the same reference characters. Running alongside the front of the machine is the main driving shaft 3 on one end of which are the usual fast and loose pulleys indicated at 4. In practice the right-hand base is fixed or stationary upon the floor bed while the other base is adapted to be moved toward and away from the right-hand base. Provision is made herein for moving the adjustable base either by hand or power and to this end I provided a long horizontal screw 5 mounted at its right-hand end portion, Figs. 2 and 5, in the right-hand base and screw threaded into a part of the left-hand base with the result that upon rotation of the screw the left-hand base is adjusted according to the direction of movement of the screw. This screw is provided with a hand wheel 6 for hand adjustment and also with a friction clutch 7 splined upon the screw and arranged to be brought into engagement by means of the clutch shifter 8, Fig. 3, with either the pulley 9 or 10, Fig. 4, accordingly as it is desired to adjust the base in one direction or the other. These two pulleys 9 and 10 are mounted loosely upon the screw 5 and are driven by belts 11 from pulleys 12 on the main shaft 3.

The machine is provided with a second main driving shaft 13 extending horizontally from end to end of the machine and serving as a part of the driving connections for the gluing mechanism, dowel driving mechanism and the clamping bar. This shaft is driven from the main shaft 3 by means of the two pulleys 14 and 15, connecting belt 16, pinion 17 on the same shaft 18 as the pulley 15, and gear 19 secured to said shaft 13. This latter shaft is caused to be driven by the operator by manipulating the lever 20 at the front of the machine, Figs. 3 and 6, the movement of such lever being communicated to a belt tightener 21 coöperating with the belt 16. As shown in Figs. 2, 3, 5 and 6 this lever which coöperates with the quadrant 22 is secured at its lower end to a rock shaft 23 journaled in the front side of the right-hand base and provided at one end with the rock arm 24, the belt tightener 21 hereinbefore referred to and which is in the form of a roller being journaled in the outer end thereof.

The outer end of each base is provided with a main cross shaft 25 operatively connected with the main shaft 13 by driving connections which are similar so that the same description and reference characters will apply to both. As shown more particularly in Figs. 2, 3 and 5 the shaft 13 has a bevel gear 26 meshing with a bevel pinion 27 secured to the lower end of a short vertical shaft 28 mounted in the end of the base and having a bevel pinion 29 at its upper end. This latter pinion meshes with a bevel gear 30 secured to the main cross shaft 25 for driving the same.

Having now described the main operating or driving connections and the bases or frame of the machine I will proceed to describe the boring mechanism, the gluing mechanism and the dowel driving mechanism, in the order named.

*The boring mechanism.*—Each base has a boring mechanism which as shown more particularly in Fig. 2 comprises a carriage 31 for the arbors 32 of a series of bits 33 which are in the present instance four in number and arranged in the same horizontal plane. These arbors are suitably journaled in bearings 34 on said carriage and are provided intermediate their length with a series of intermeshing pinions 35. The foremost arbor of the set is extended at 36 and journaled at its outer end in the bearing 37. This extended portion of the arbor is provided with a pinion 38 meshing with a gear 39 secured to the main shaft 3, Fig. 5. By the rotation of this latter shaft the pinion 38 and consequently the series of pinions 35 are rotated, thereby rotating the bits 33. It will be understood that the extended portion 36 of the arbor is movable longitudinally in the bearing 37 during the reciprocating movements of the carriage 31.

The carriage is reciprocated by operating connections with the cross shaft 25, the same being shown on the left-hand side of Fig. 8. Projecting laterally upon the carriage is a bracket 40 carrying at its lower end a roller 41 adapted to coöperate with a cam 42 secured to the shaft 25 and with an actuating rock arm 43. The cam 42 is adapted to force carriage and bits inwardly during the boring operation and the arm 43 is adapted to retract such carriage and bits. This arm is operated by means of a second cam 44 also secured to the shaft 25 and adapted to contact a cam roller 45 journaled in the outer end of an arm 46 secured to the same rock shaft 47 to which the lower end of the rock arm 43 is fastened, it being understood that the rock shaft 47 is suitably journaled on one end of the base. It is evident that after the cam 42 has passed or cleared the roller 41 the other cam 44 will operate the rock arms so as to cause the arm 43 to bear against the roller 41 and thereby retract the carriage and bits.

In order to adjust the range of throw of the carriage and bits I provide a suitable adjustment by suitably connecting the bracket or plate 40 with the carriage through a bolt and slot connection, the bolt being indicated at 48 and the slot at 49 and I also provide an adjusting screw 50 adapted to bear against the inner end of the bracket for moving or adjusting it to a nicety.

*The gluing mechanism.*—The gluing mechanism which is next in order after the boring mechanism is more particularly illustrated in Figs. 2, 8 (right-hand side) and 12. This mechanism comprises a series of glue fingers 51 which are here four in number and secured in the chuck portions of spindles or arbors 52 and journaled to rotate in one member of a U-shaped frame or yoke 53 which is pivoted by means of a shaft 54 to another yoke 55. This shaft 54 is provided with a bevel pinion 56 meshing with a bevel pinion 57 secured to one of the spindles or arbors 52, the rotary motion being transmitted to the other spindle through the series of intermeshing pinions 58 secured to said spindles. At one end the shaft 54 is provided with a pinion 59 meshing with a rack 60 upon the top of the base plate with the result that as the yokes are reciprocated in the manner hereinafter described the meshing of the pinion 59 upon the rack will cause a rotation of the glue fingers, such rotation taking place during the actual operation of the introduction of the glue into the holes by means of the fingers. The yoke 55 is secured to or forms a part of a reciprocating plate 61 adapted to slide in a block 62 which is here shown as solid with a carriage 70 adapted to reciprocate or slide upon the top of the base of the machine. This block is provided with a yoke 63 between which and a lug 64 on the yoke 61 is interposed a spring 65, such spring being kept in position by means of the bolt 66, as shown in Fig. 8. The parts described particularly the spring constitute a yielding driving connection for the gluing fingers in order to prevent breakage of or injury to such fingers in event that one or more of the bits are broken off and left in the holes in the rails, it being understood that in case one of the glue fingers should strike such broken bit, the finger frame would not be advanced farther but the continued movement of the driving parts would be taken up by means of the spring 65.

In the upper portion of the base and below the gluing mechanism is arranged a glue vat or receptacle 67 into which the glue fingers are adapted to automatically dip to receive a fresh supply of glue for each of its operations. In order to provide for the dipping or oscillating movement of the fingers such fingers and their spindles are mounted as above described that is in the yoke 53 which is adapted to oscillate on the shaft 54 as an axis. When the gluing mechanism as a whole is withdrawn that is moved outwardly away from the stock the yoke 53 is moved downwardly thereby oscillating the fingers and dipping them into the glue. This operation is automatic through the following means: This yoke 53 is extended at one side at 53ᵃ and is provided with a roller 68 adapted to coöperate with a bar 69 secured to the top of the base and having its under surface formed of irregular shape to constitute a cam surface for the roller 68. When the gluing mechanism as a whole has been withdrawn to such an extent that the roller 68 arrives at the inclined portion 69ᵃ of the cam way, the yoke 53 and the glue fingers will swing downwardly by gravity, being overbalanced at their inner ends. At this time the glue fingers are at such a position as to clear the inner end of the glue vat or tank and will dip into the glue and become coated therewith. The movement of the entire gluing mechanism in the opposite direction that is inwardly will cause a reversal of operation, that is to say, the cam surface 69ª will cause a swinging of the glue fingers upwardly to the horizontal position and a continued movement of the mechanism will force the glue fingers into the holes in the rail previously bored by the boring mechanism.

The block 62 is secured to or forms a part of the carriage 70 which is mounted to slide in a slideway in the top surface of the base of the machine. This carriage is reciprocated by suitable driving connections with the main cross shaft 25. As shown more particularly in Figs. 8 and 12 these driving connections which are substantially the same as those for operating the carriage of the boring mechanism, comprise a bracket 71 adjustably connected with the carriage by bolt and slot connections and carrying at its outer or free end a roller 72, with which coöperate the cam 73 and rock arm 74. This cam is secured to the main cross shaft 25 and is adapted to force the carriage inwardly whereas the rock arm 74 is adapted to retract such carriage. This arm together with arm 76 forming part of the same structure is mounted to rock upon a fixed pin 75, the arm 76 carrying at its outer end a roller 77 adapted to be contacted by a cam finger 78. By contact of this latter cam with the roller the rock arm 74 is moved in a clock-wise direction (Fig. 12) thereby retracting the carriage.

*The dowel driving mechanism.*—This mechanism which is more particularly illustrated in Figs. 2, 10 and 11 comprises a reciprocating carriage 79 adapted to slide in slideways at the top surface of the base and carrying at its inner end a series of dowel drivers 80 which are here four in number. These drivers which are adjustably secured to the vertical bracket 79ª at the inner end of the carriage are adapted to pass through the dowel hopper at or near the bottom thereof and to force dowels in front of them and into the holes previously bored and glued by this machine as hereinbefore described. The hopper comprises a receptacle of suitable shape and dimensions consisting of a bottom 81, opposite sides or ends 82, a back 83 and a front 84, the latter of which will be more particularly described hereinafter, whose bottom 81 is secured to the top surface of the base of the machine and provided with a series of slots 85 (four in number in the present instance) to receive the dowels to be driven. Between the slots 85, there rise from said bottom a series of vertical partitions 86 forming in connection with each other and with the ends 82 of the hopper vertical continuations of the slots. These slots are of such a width that the slots will each contain a single vertical row of dowels, the lowermost ones of which are adapted to be forced from the hopper through the openings 87 formed on the front 84 of the hopper at the base of the slots, the drivers 80 which act as plungers entering corresponding openings 88 in the back 83 of the hopper, Figs. 6, 10 and 11. In order to keep the dowels fed straight into the slots I prefer to provide some agitating means such as the movable agitators 89 at the upper end of the partitions 86 which latter are provided with vertical holes through which pass the agitator pins 90. These pins are secured at their upper ends to the agitators and at their lower ends to a horizontal plate 91, the pins passing through the bottom of the hopper and the plate being located below the top surface of the base of the machine. Below such surface is pivoted a lever 92 of the first class the inner end thereof being located below and in proximity to the plate 91 so as to contact the latter and thereby operate the agitators. The other end of the lever has an irregular or cam shaped upper surface 92ª which coöperates with a roller 93 journaled in a bracket or bearing 94 depending from the under side of the carriage 79, Fig. 10. The reciprocating movements of this carriage automatically agitate or move the lever 92 and irregular movements or agitations are communicated to the agitators 89 by means of the plate 91 and the pins 90. The base of the hopper is preferably provided on its inner side adjacent the path of travel of the rail with a projection or flange 87ª which supports the dowels as they are driven from the hopper and into the dowel holes in the rails, Figs. 2 and 10.

By preference and as herein shown the dowel hopper is provided at its front side with a safety means to prevent accident or breakage in case of clogging of any of the dowels. Referring to Figs. 12 and 13 the lower portion 84ª of the front side of the hopper is pivoted at its upper end upon the pintle 95 mounted upon the hopper, so as to swing outwardly as a door against the resistance of the springs 96. These springs are secured respectively to the door and to the sides of the hopper and tend to hold the door closed. It is evident that in case the dowels should become clogged as the drivers start to drive them (the clogging preventing their being driven through the outlet holes) the door will automatically open and allow the clogged dowels or any broken or bad pieces to come out, thereby preventing injury to or breakage of the hopper or drivers. Moreover, this arrangement permits the operator to open the door at any time he desires to straighten out the dowels. Furthermore, the entire back 83 of the hopper is readily removable by loosening the bolts 83ª thereby giving the operator access to the whole interior of the hopper.

As shown in Fig. 10 the carriage 79 is reciprocated by driving connections with the main cross shaft 25 in substantially the same manner as the carriages for the boring and gluing mechanism, such connections comprising a bracket 97 adjustable on the carriage 79 by bolt and slot connection and having a roller 98 with which coöperates a cam 99 and a rock arm 100. This cam is secured to the cross shaft 25 and is adapted to move the carriage 79 inwardly. The rock arm 100 which is adapted to retract the carriage or move it to the right (Fig. 10) together with a short arm 95 forming part of the same structure is mounted upon a fixed pin 101, the arm 102 being provided at its outer end with a roller 103. This roller is operated by means of a cam finger 104 which is secured to the shaft 25. Contact of this finger with the roller 103 rocks the arm 102 and consequently the arm 100, thereby retracting the carriage 79. By preference one side of the dovetail ways or gibs for all the carriages is adjustable to take care of wear on slide.

Having now described the boring, gluing and dowel driving mechanisms I will proceed to describe the feeding mechanism for feeding the rails automatically and successively from the hopper to each of said mechanisms.

*The rail feeding mechanism.*—In the duplex form of machine herein described in which both ends of the rail are operated upon simultaneously by the several different mechanisms above described the rails are fed from the hopper formed by the upright plates 105 between the two sets of mechanisms and finally discharged from the opposite side of the machine. In this particular machine each of the two bases has similar feeding mechanism each of which acts upon the rails simultaneously near opposite ends thereof. A description of one feeding mechanism will therefore apply to both. Referring more particularly to Figs. 2, 5 and 6 a plate or beam 106 is arranged in a horizontal position adjacent to and below the plane of the bits, glue fingers and dowel drivers when in action, such beam forming a guide and support for the stop as it is fed across the machine. This beam has a depending portion 106ª which is mounted to slide vertically for vertical adjustment upon a projecting portion 2ª of the base, Fig. 5. The lower end of this depending portion of the beam is provided with projections or lugs 107 having screw threaded holes to receive adjusting screws 108 carrying at their lower ends bevel pinions 109 which are journaled in bearings 110 on the side of the base of the machine. These bevel pinions mesh with bevel gears 111 secured to a horizontal shaft 112 journaled in bearings 113 on the side of the base and actuated by the hand wheel 114. It is obvious that by the rotation of this hand wheel in one direction or the other the entire beam will be raised or lowered as the case may be so as to properly present the stock to the different mechanisms in proper position.

The bar or beam 106 is dove-tailed on one side to receive a sliding bar 115 which is adapted to reciprocate in the beam in a horizontal direction by driving connections hereinafter described. This sliding bar is itself dove-tailed to receive a second sliding bar or dog carrier 116, the same being normally in fixed relationship with the sliding bar 115 and adapted to partake of all of its movements but arranged to be adjusted longitudinally thereof. As shown in detail in Fig. 9 the dog carrier is turned at right angles at one end to form a flange 116ª through which passes an adjusting screw 117 which enters a screw threaded hole in one end of the sliding bar 115. By turning this screw in one direction or the other the relative position of the bar 115 and dog carrier 116 may be adjusted, thereby resulting in different amounts of throw and place of positioning of the rails by the dogs, enabling the dowels to be located at the desired distances from the side edges of the rails.

Upon one side of the dog carrier are pivoted on the studs 118 a series of dogs 119 which are here four in number. As shown more particularly in Figs. 6 and 15 each dog is of irregular form comprising an upwardly projecting and inclined portion 119ª normally extending into the path of movement of the rails and a main portion 119ᵇ of block formation and heavier than said projecting portion, so that by gravity such projecting portion is normally held into the path of feed of the rails. Each dog is recessed at one side at 119ᶜ to form a shoulder acting as a stop in connection with a pin 120 projecting laterally of the dog carrier. It will be understood that these dogs are properly spaced apart according to the width of the rails being fed through the machines, each dog with the exception of the last dog on the left in Fig. 6 being here shown in position to contact the front side of a rail.

The driving connections for reciprocating the sliding bar 116 are here shown as comprising a gear wheel 121 journaled on one side of the base of the machine and driven by a pinion 122 mounted on the main shaft 13, and adapted to actuate a rocker arm 123 which is operatively connected by means of the link 124 with the bar 116. The gear wheel 121 is provided with a crank pin 125 having a block 126 adapted to travel in the slot 123ª of the rocker arm. This rocker arm is pivoted at its lower end at 127 on the base of the machine and the construction and arrangement is such that the rotary movement of the gear wheel is translated into a reciprocating motion by means of the rocker arm and the connecting link.

In the position of parts illustrated in Fig. 6 the dogs have fed the rails to positions for operation by the several different mechanisms A, B and C and the timing of the movements of the machine is such that during the action of these mechanisms the sliding bar 116 is reciprocated to the right (Fig. 6) during which movement the dogs will be slightly oscillated in an anti-clockwise direction, being free to move in this direction when sliding underneath the rails. It being understood that the rails are stacked or piled one above the other in the hopper at the right (Fig. 6) as shown by dotted lines, the last dog on the right will jump upwardly as soon as it has cleared the right-hand side or edge of the lowermost rail of the pile and will be in a position to engage said side. At the same time the other three dogs will engage on the right-hand side or edge of the three rails just acted upon by the three mechanisms A, B and C. Further operation of the driving mechanism will reciprocate the bar 116 toward the left with the result that a new rail will be fed from the pile in the hopper, the complete rail will be discharged and the other two rails will be moved one position or station to the left for an additional treatment. This operation continues in automatic manner so long as the hopper is kept supplied with rails and in the form of machine herein shown both ends of the rails will be acted upon simultaneously. To accommodate different widths of rails the hopper is provided with guides 128 which are adjustable toward or away from each other on the plates 105 of the hopper and held in adjusted position by means of clamping bolts 129 slidable in the horizontal slots 105ª. Of course the adjustment of the hopper for different lengths of rail is obtained by merely adjusting the left-hand base (Fig. 2) toward or away from the stationary base. In order to hold the rails firmly in position while being acted upon I provide clamping mechanism which will now be described.

*The clamping mechanism.*—Each base is provided with a clamping mechanism which is similar in construction and operation. Each of these mechanisms consists of a beam or frame 130 pivoted upon a cross shaft 131 mounted in standards 132 rising from the top of the base and carrying at its inner end directly above the beam 106 a clamping bar 133. The beam is pivoted substantially at its central portion and for adjusting the balance thereof the same is provided at one end with the adjusting weights 134 but the pressure which is applied by the clamping bar is caused in a positive manner by means of the two cams 135 secured to the main cross shaft 25, Fig. 3. Each cam coöperates with a cam roller 136 depending from a corner of the beam with the result that such beam is rocked and its clamping bar forced downwardly upon the rails at the proper time by reason of the peculiar formation of the cam, Fig. 5, the releasing of the clamping action being obtained by gravity due to the weighted outer end of the beam.

In order to provide for stock of different thicknesses, the amount of movement of the clamping bar is adjustable and to obtain this result the cam rollers 136 are vertically adjustable in their supports or bearings in the beam. As shown in Fig. 7 each cam roller is journaled in the lower end of a bearing 137 whose upper end is in the form of a tube vertically movable in a portion of the beam but held against rotary movement by means of the cross pin 138. This tube is interiorly screw threaded to receive an adjusting screw 139 journaled on the beam and provided at its upper end with a bevel pinion 140 adapted to mesh with a similar pinion 141 which is secured to a shaft or rod 142 journaled in the beam and extending transversely thereof. A hand wheel 143 is secured to this shaft at one end thereof. The adjusting mechanism and operating connections for both of the rollers 136 are the same and are operated by the same shaft 142 so that when the hand wheel 143 is operated the rollers are operated in unison and to the same extent. It will be understood that a raising of the rollers is necessary for thick stock and a lowering of such rollers is necessary for thin stock, the extent of downward movement of the clamping bar being dependent upon the adjustment of these rollers.

By preference the clamping bar 133 is made as illustrated in detail in Figs. 15 and 16, wherein the under face thereof is shown provided with members for directly engaging the rails. Near the longitudinal edges the bar is provided with strips 144 of resilient material such as rubber and with a series of spring pressed shoes 145, of suitable number and arranged intermediate the strips and preferably along the middle line of the bar. Each shoe which is of suitable material such as steel, cast iron or brass is movable vertically in a recess 133ª in the underside of the bar and is connected with a plunger or piston head 146 vertically movable in a chamber 133ᵇ in the bar. This plunger has a rod 147 mounted to slide in the bar and having an adjusting nut 147ª. A coiled spring 148 around the rod abuts respectively against the bar and the plunger, thereby holding the shoes outwardly with a yielding pressure. The construction and arrangement is such that these shoes are constantly in contact with the top surface of the rails passing through the machine with the result that the rails are held back against their feed dogs to keep them where they belong and to prevent any overthrow or misplacing in the feeding operation. These shoes yield in the downward movement of the clamping bar and it is only substantially when the bar has been fully lowered that the rubber strips contact the rails to hold them firmly in position for action by the different mechanics to operate thereon.

I claim:

1. A doweling machine comprising, a horizontal track for rails to be operated on, boring mechanism, gluing mechanism and dowel driving mechanism operating in a horizontal plane slightly above the plane of said track which is common to all such mechanisms, means for operating said mechanisms, and means for feeding the rails one at a time and successively along the track to the different mechanisms.

2. A doweling machine comprising, a horizontal track for rails to be operated on, boring mechanism, gluing mechanism and dowel driving mechanism operating in a horizontal plane slightly above the plane of said track which is common to all such mechanisms, means for operating said mechanisms, a hopper arranged in advance of said mechanisms and arranged to receive a supply of rails, the lowermost one of which always rests upon the track, and means for feeding the rails one at a time and successively along the track to the different mechanisms.

3. A doweling machine comprising boring mechanism, gluing mechanism, dowel driving mechanism, a hopper arranged in advance of said mechanisms for receiving a supply of the rails, a series of feed dogs for feeding the rails one at a time and successively from the hopper to said mechanisms respectively.

4. A doweling machine comprising, as a unitary structure, boring mechanism, gluing mechanism, dowel driving mechanism, means arranged in advance of said mechanisms for feeding the stock successively from one of the mechanisms to the other, and means for operating said mechanisms.

5. A doweling machine comprising, as a unitary structure, boring mechanism, gluing mechanism, dowel driving mechanism, all arranged in the same horizontal plane, a track common to said mechanisms, a hopper for the rails at one end of the track, and means for feeding the rails one at a time from the hopper and along the track to said different mechanisms successively.

6. A doweling machine comprising, as a unitary structure, boring mechanism, gluing mechanism, dowel driving mechanism, all arranged in the same horizontal plane, a track common to said mechanisms, a hopper for receiving a supply of the rails one above the other, and means for feeding the rails one at a time from the bottom of the hopper and along the track to said different mechanisms successively.

7. A doweling machine comprising, as a unitary structure, boring mechanism, gluing mechanism, dowel driving mechanism, all arranged in the same horizontal plane, a track common to said mechanisms, a hopper for receiving a supply of the rails, and a series of four feed dogs for feeding the rails one at a time from the hopper and along the track to the boring, gluing and dowel driving mechanisms successively.

8. A doweling machine comprising, as a unitary structure, boring mechanism, gluing mechanism, dowel driving mechanism, and a single feeding means for feeding rails to all of said mechanisms including a series of four feed dogs for feeding the rails successively to said mechanisms respectively, said feed dogs being adjustable to change their feed position relative to said mechanisms.

9. A doweling machine comprising, as a unitary structure, boring mechanism, gluing mechanism, dowel driving mechanism, and a single feeding means for feeding rails to all of said mechanisms including a series of four feed dogs for feeding the rails successively to said mechanisms respectively, said feed dogs being adjustable to change their feed positions relative to said mechanisms.

10. A doweling machine comprising gluing mechanism, dowel driving mechanism, a track common to said mechanisms, a reciprocating push bar mounted to slide in said track, and a series of feed dogs mounted in the bar and arranged to feed the rails successively to said mechanisms respectively.

11. A doweling machine comprising gluing mechanism, dowel driving mechanism, a track common to said mechanisms, a reciprocating push bar mounted to slide in the track and made in two sections adjustable upon each other, a series of feed dogs mounted upon one of the sections and arranged to feed the rails one at a time and along the track successively to said mechanisms respectively, and means for operating the bar.

12. A doweling machine comprising gluing mechanism, dowel driving mechanism, a track common to said mechanism, a reciprocating push bar mounted to slide in said track, and a series of feed dogs pivoted in the bar and arranged to engage the rails and to feed them along the track successively to said mechanisms respectively.

13. A doweling machine comprising, as a unitary structure, boring mechanism, gluing mechanism, dowel driving mechanism, a track common to said mechanisms, a hopper arranged at one end of the track for receiving a supply of the rails, a reciprocating push bar, a series of feed dogs mounted on the bar and arranged to feed the rails one at a time and along the track successively from the hopper to said mechanisms respectively, and means for operating the bar.

14. A doweling machine comprising, as a unitary structure, boring mechanism, gluing mechanism, dowel driving mechanism, a track common to said mechanisms, a hopper arranged at one end of the track for receiving a supply of the rails, a reciprocating push bar made in two sections adjustable upon each other, a series of feed dogs mounted on one of the sections and arranged to feed the rails one at a time and along the track successively from the hopper to said mechanisms respectively, and means for operating the bar.

15. In combination with gluing and dowel driving mechanisms, a main bar arranged adjacent said mechanisms and coöperating with all of them, said bar forming a feed way for the rails, a second bar mounted to reciprocate on the main bar, and rail feeding means on the reciprocating bar.

16. In combination with gluing and dowel driving mechanisms, a main bar arranged adjacent said mechanisms and coöperating with all of them, said bar forming a feed way for the rails, a second bar mounted to reciprocate on the main bar, said second bar being made in two sections adjustable on each other, driving connections coöperating with one of the sections, and feed dogs mounted on the other thereof.

17. In combination with gluing and dowel driving mechanisms, a main bar arranged adjacent said mechanisms and coöperating with all of them, said bar forming a feed way for the rails, a second bar mounted to reciprocate on the main bar, said second bar being made in two sections slidable upon each other, an adjusting screw connecting between the two sections and arranged to adjust them relative to each other, and rail feeding means mounted upon one of the sections.

18. In combination with gluing and dowel driving mechanisms, a main bar arranged adjacent said mechanisms and coöperating with all of them, said bar forming a feed way for the rails, a second bar mounted to reciprocate on the main bar, and feed dogs pivoted on the reciprocating bar and having portions normally projecting into the path of the rails.

19. In combination with gluing and dowel driving mechanisms, a main bar arranged adjacent said mechanisms and coöperating with all of them, said bar forming a feed way for the rails, a second bar mounted to reciprocate on the main bar, and feed dogs pivoted on the reciprocating bar and having portions normally projecting into the path of the rails, said dogs having means for limiting the degree of such projection.

20. In combination with gluing and dowel driving mechanisms, a main bar arranged adjacent said mechanisms and coöperating with all of them, said bar forming a feed way for the rails, a second bar mounted to reciprocate on the main bar, a rocker arm, a link connecting between the arm and the reciprocating bar, rail feeding means on the latter bar, and means for rocking the arm.

21. In combination with gluing and dowel driving mechanisms, a main bar arranged adjacent said mechanisms and coöperating with all of them, said bar forming a feed way for the rails, a second bar mounted to reciprocate on the main bar, a slotted rock arm, a link connecting between the arm and the reciprocating bar, a wheel having a crank slidable in the slot of the arm for rocking it, and rail feeding means on the reciprocating bar.

22. In combination with gluing and dowel driving mechanisms, a main bar arranged adjacent said mechanisms and coöperating with all of them, said bar forming a feed way for the rails, a second bar mounted to reciprocate on the main bar, rail feeding means on the reciprocating bar, and means for raising and lowering the main bar for adjusting the path of feed relative to said mechanisms.

23. In combination with gluing and dowel driving mechanisms, a main bar arranged adjacent said mechanisms and coöperating with all of them, said bar forming a feed way for the rails, a second bar mounted to reciprocate on the main bar, rail feeding means on the reciprocating bar, a base for supporting said mechanisms, said main bar being arranged to slide vertically on the base, and means for adjusting such main bar vertically.

24. In combination with gluing and dowel driving mechanisms, a main bar arranged adjacent said mechanisms and coöperating with all of them, said bar forming a feed way for the rails, a second bar mounted to reciprocate on the main bar, rail feeding means on the reciprocating bar, a base for supporting said mechanisms, said main bar being arranged to slide vertically on the base, and having a depending portion, and a pair of adjusting screws coöperating with such depending portion for adjusting the main bar.

25. In combination with boring, gluing and doweling mechanisms and with means for feeding rails thereto, yielding pressure means common to all of said mechanisms constantly acting upon the rails presented to and operated upon by such mechanisms.

26. In combination with boring, gluing and doweling mechanisms and with means for feeding rails thereto, a spring pressed shoe common to all of said mechanisms and arranged to constantly press upon the rails.

27. In combination with doweling mechanism and with means for feeding rails thereto, a clamping bar, and a spring pressed shoe therein arranged to constantly press upon the rails.

28. In combination with doweling mechanism and with means for feeding rails thereto, a clamping bar having yielding pressure means constantly acting upon the rails, and resilient strips for contacting the rails when the bar is operated.

29. In combination with doweling mechanism and with means for feeding rails thereto, a clamping bar, a series of spring pressed shoes therein for constantly pressing upon the rails, and resilient strips on the bar for contacting the rails when the bar is operated.

30. In combination with doweling mechanism and with means for feeding rails thereto, a clamping bar having a recess on its under side and also a connecting chamber, a shoe movable in such recess, a plunger connected with the shoe and movable in the chamber, and a spring for holding the plunger and shoe projected with a yielding pressure.

31. In combination with doweling mechanism and with means for feeding rails thereto, a clamping bar having a recess on its under side, and also a connecting chamber, a shoe movable in such recess, a plunger connected with the shoe and movable in the chamber, a bolt secured in the bar and passing through the plunger, and a spring for holding the plunger and shoe projected with a yielding pressure.

32. In combination with doweling mechanism and with means for feeding rails thereto, a clamping bar, a series of spring pressed shoes arranged along substantially the middle line of the under side of the bar, and a resilient strip arranged on either side of the shoes.

JOHN R. FRANTZ.

Witnesses:
   Carl Reise,
   R. Lutz.